United States Patent
Harder et al.

(10) Patent No.: US 6,613,870 B1
(45) Date of Patent: *Sep. 2, 2003

(54) ACRYLATE HOT MELT-BASED SELF-ADHESIVE COMPOSITION

(75) Inventors: Christian Harder, Hamburg (DE); Andreas B. Kummer, Hamburg (DE); Klaus Biethahn, Norderstedt (DE); Robert Tiburg, Hamburg (DE)

(73) Assignee: tesa AG, Hamburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/847,395

(22) Filed: Apr. 24, 1997

Related U.S. Application Data

(63) Continuation of application No. 08/516,733, filed on Aug. 18, 1995, now abandoned, which is a continuation of application No. 08/230,355, filed on Apr. 20, 1994, now abandoned.

(30) Foreign Application Priority Data

Apr. 21, 1993 (DE) .......................................... 43 13 008

(51) Int. Cl.$^7$ .................................................. C08F 6/10
(52) U.S. Cl. ...................... 528/481; 528/491; 528/501; 524/555; 524/558; 428/343; 428/344; 428/346; 428/349
(58) Field of Search ............................... 524/555, 558; 526/320; 528/481, 501; 156/244.11, 244.24, 244.26; 264/204, 205; 428/343, 344, 346, 349; 427/207.1, 208.2, 208.4

(56) References Cited

U.S. PATENT DOCUMENTS

| 3,252,950 | A | * | 5/1966 | Terenzi | 528/501 |
|---|---|---|---|---|---|
| 3,441,430 | A | * | 4/1969 | Peterson | 117/68.5 |
| 3,971,766 | A | * | 7/1976 | Ono | 526/320 |
| 3,984,509 | A | * | 10/1976 | Hall et al. | 264/40.1 |
| 4,226,671 | A | * | 10/1980 | Christensen | 159/47 R |
| 4,337,721 | A | * | 7/1982 | Varga | 118/60 |
| 4,702,787 | A | * | 10/1987 | Ruskin et al. | 156/244.25 |
| 4,728,701 | A | * | 3/1988 | Jarvis | 528/501 |
| 4,762,748 | A | * | 8/1988 | Oberle | 428/349 |
| 4,909,898 | A | * | 3/1990 | Padliya | 528/501 |
| 5,084,348 | A | * | 1/1992 | Czech | 428/355 |
| 5,094,912 | A | * | 3/1992 | Deibig | 428/355 |
| 5,194,455 | A | * | 3/1993 | Massow et al. | 522/152 |
| 5,302,629 | A | * | 4/1994 | Berejka | 524/558 |
| 5,324,762 | A | * | 6/1994 | Overend | 524/558 |
| 5,605,720 | A | * | 2/1997 | Allen et al. | 427/288 |
| 6,436,528 | B1 | * | 8/2002 | Kulper et al. | 428/343 |

FOREIGN PATENT DOCUMENTS

| DE | 30 30 541 | | 2/1982 |
|---|---|---|---|
| DE | 31 03 483 | | 4/1982 |
| DE | 31 30 766 | | 2/1983 |
| DE | 33 09 866 | | 9/1983 |
| DE | 37 00 248 | | 7/1988 |
| EP | 0 411 510 | | 2/1991 |
| EP | 0 431 336 | | 6/1991 |
| WO | WO9306184 | * | 4/1993 |

OTHER PUBLICATIONS

Derwent Abstract, Week 9035, AN 90–265703 & JP–A–2 187 404.
"Result of Consultation" dated Feb. 12, 1997 in German with English Translation.
Patent Abstracts of Japan, JP 2–6505 A2, C–701 Mar. 14, 1990, vol. 14/No. 134.

* cited by examiner

*Primary Examiner*—James J. Seidleck
*Assistant Examiner*—Olga Asinovsky
(74) *Attorney, Agent, or Firm*—Norris McLaughlin & Marcus

(57) ABSTRACT

Acrylate hot melt-based self-adhesive composition, characterized by K value of at least 60, in particular 65–80, and obtainable by concentrating or devolatilizing a solution of such a composition in a devolatilizing extruder to give a system which can be processed as a hot melt.

8 Claims, No Drawings

ACRYLATE HOT MELT-BASED SELF-ADHESIVE COMPOSITION

This application continuation of application Ser. No. 08/516,733, filed on Aug. 18, 1995, now abandoned, which is a continuation of application Ser. No. 08/230,355, filed on Apr. 20, 1994, now abandoned.

The invention relates to an acrylate hot melt-based self-adhesive composition having a K value of at least 60.

Acrylate hot melt-based self-adhesive compositions are known, but these are unsuitable or insufficiently suitable for many applications due to their low K value. There are therefore commercially available compositions of this type in the form of low-viscosity systems, for example as HRJ 4326 (Schenectady Chemicals) having a K value of 31 (Beiersdorf test method) and a viscosity of 3.8 Pa·s at 177° C. (350° F.), and ACRONAL DS 3429 X (BASF) having a K value of 40 and a viscosity of 13 Pa·s at 120° C. However, these and similar compositions are unsuitable for coating woven and nonwoven materials, for example as supports for self-adhesive tapes or plasters, since they pass through such supports. In addition, their adhesive strength is too low, in particular, for technical applications.

The restriction of known compositions of this type to low-viscosity systems is attributable, in particular, to the fact that the requisite concentration step places high demands on the flow behaviour and the resistance to heat and shear. The adhesive compositions, which are prepared in solution, are therefore usually concentrated directly in the reactor. This operation requires:

A low viscosity of the system, even in the highly concentrated state, in order to allow effective degassing and mixing.

A low viscosity of the compositions to allow economical removal thereof from the reactor.

Using the same technology, compositions of higher viscosity would have the following disadvantages, inter alia:

Higher viscosity systems would result in a significantly increased demand for thermal energy here, which would result in increased heating of the compositions (side reactions/decomposition).

The use of lower temperatures would result in a correspondingly high shear stress of the composition systems.

For the above reasons, it has hitherto not been possible to prepare acrylate hot-melt adhesives having higher K values, but compositions of low viscosity have adhesion-related weaknesses as far as shear strength is concerned.

The object of the invention was to provide a remedy here, in particular to provide acrylate hot melt-based self-adhesive compositions which have a K value of at least 60, in particular 65–80.

Such compositions are not commercially available, in particular because there is no industrially practicable and appropriate process for their preparation, despite the fact that there is considerable interest in such compositions and extensive development work being carried out to increase the K values of the compositions available hitherto.

This object is achieved according to the invention by the compositions and their preparation as characterized in greater detail in the claims.

The use of a devolatilizing (vented) extruder for the purposes of the invention was not obvious to the person skilled in the art for a number of reasons; it would have been strongly expected that high K values of the acrylate hot melt, such as those of at least 60, would result in degradation of the macromolecules due to shear forces and heat treatment competing with the devolatilization, gelling owing to reactive co-components, and fundamental reservations against an excessive solvent content, as is now apparent in the form of a prejudice against the use of a devolatilizing extruder for high-molecular-weight adhesive products of this type. Although it has already been disclosed, in European Patent 411 510, to remove volatile constituents from a polymer solution in the extruder, as occurs, in particular, for the removal of residual monomers. This European Patent nevertheless, as conventional in the prior art, uses various thermoplastics, such as polycarbonate, polyphenylene ether or polystyrene, which are not comparable with the acrylate hot melt having a high K value which is employed according to the invention. The reason for this is that the person skilled in the art has a prejudice against conveying adhesive compositions in a devolatilizing extruder.

Preference is given according to the invention to the measures mentioned in the sub-claims. The solvents used are, for example: gasoline, acetone, ethyl acetate, toluene, $C_1$–$C_5$-alcohols, $C_5$–$C_9$-alkanes and mixtures thereof. The concentration can be carried out by additionally using suitable measures, such as the use of entrainers, for example water, to assist with the devolatilization process. In addition, the vacuum can preferably be broken using a protective gas, such as nitrogen or argon. It is particularly favourable if the extruder used has one or preferably more independently heatable zones. The conveying capacity is preferably matched to the acrylate hot melt to be processed in each case by adjusting the rotational speed and the screw configuration.

Advantages are thus achieved according to the invention which were unforeseeable by a person skilled in the art.

Even compositions having high K values can be devolatilized while protecting the material, since the temperature and shear rate can be matched to requirements. Restrictions with respect to formulation possibilities have been overcome compared with low-viscosity systems.

Flowing of the compositions at the 100% stage is not absolutely necessary due to the mechanical conveying.

In contrast to the batch procedure, continuous production is possible.

The compositions having high K values also satisfy the requirements of an industrial adhesive tape.

The shear strength of these systems are higher, and the requisite processing effort is lower.

The invention is described below with reference to illustrative embodiments, without wishing unnecessarily thereby to restrict the invention.

EXAMPLE 1

The monomer mixtures below (amounts in % by weight) were copolymerized in solution. The polymerization batches comprised 60% by weight of the monomer mixtures and 40% by weight of solvent.

The solutions were first freed from oxygen by flushing with nitrogen in conventional reaction vessels made of glass or steel (fitted with reflux condensers, stirrers, temperature measurement unit and gas-inlet tube) and then warmed to the boil. The polymerization was initiated by addition of an initiator conventional for free-radical polymerization, such as peroxides or azo initiators. During the polymerization time of about 20 hours, the batch was, when appropriate, diluted a number of times with further solvent depending on the viscosity, so that the finished polymer solutions had solids contents of from about 35 to 55% by weight.

A 40% solution of this acrylic acid or acrylate copolymer having a K value of 68 (76% of ethyl hexyl acrylate, 21% of n-butyl acrylate and 3% of acrylic acid) in a mixture of gasoline (60/95) and acetone in the ratio 3:1 was separated into polymer and solvent by means of a single-screw extruder (d=90, l=38d). The extruder comprised a total of three independently heatable zones, each of which was provided with a vacuum connection and a nitrogen inlet. The vacuo of the zones were likewise independently adjustable both via the downstream vacuum pumps and by regulation of the nitrogen feed. The polymer solution was conveyed between the first and second zones in the extruder by means of a pump, so that the gas phase above the polymer solution was removed in one backward and two forward devolatilization steps. The initial mass flow rate of the polymer solution was 18 kg/h; and the screw speed was 100 rpm. The temperature in the backward devolatilization step was 60° C., at a pressure of 270 mbar, and the temperature in the second and third steps was set at 40 and 50° respectively, at pressures of 310 and 40 mbar respectively. The gel-free polymer was removed at the head of the extruder at a mass flow rate of 7.2 kg/h. The proportion of volatile substances in the polymer was 0.8%, and the K value was 68.

The acrylate hot melt obtained in this way could be coated in a manner known per se onto a support of woven material without passing through the latter, giving products having excellent adhesive properties.

EXAMPLE 2

A 45% solution of this acrylic acid (acrylate) copolymer having a K value of 65 (33% of ethylhexyl acrylate, 64% of butyl acrylate and 3% of acrylic acid) in acetone was concentrated by the process described in Example 1. The proportion of volatile substances was 0.8% and the K value 65.

The composition system obtained can be blended with fillers, according to EP-A 431 336 with solid glass microbeads, and converted in a manner known per se into corresponding products which have very good adhesive properties.

What is claimed is:

1. A process of treating a self-adhesive composition comprising an acrylate hot melt-based adhesive composition having a K value of at least 60, said process comprising:
    a) introducing a solution comprising said adhesive composition and solvent into a devolatilizing extruder, the amount of said solvent in said solution being from 5 to 80% by weight based on the total weight of the solution;
    b) passing said solution through said extruder;
    c) withdrawing said solvent from said extruder; and
    d) extruding an extrudate comprising said adhesive composition from said extruder, the amount of said solvent being less than 1% by weight based on the total weight of said extrudate.

2. The process according to claim 1, wherein the solution comprises from 30 to 70% by weight of solvent based on the total weight of the solution.

3. The process according to claim 1, wherein the solvent is selected from the group consisting of gasoline, acetone, ethyl acetate, toluene, $C_{1-5}$-alcohols, $C_{5-9}$-alkanes and mixtures thereof.

4. The process according to claim 1, wherein the extruder is selected from single-screw, twin-screw and multi-screw extruders, and the extruder comprises one or more devolatilization units.

5. The process according to claim 1, wherein the adhesive composition is a copolymer of at least one member selected from (meth)acrylic acid, (meth)acrylic acid esters having 1–25 carbon atoms, maleic acid, maleic acid; esters, fumaric acid, fumaric acid esters, itaconic acid, itaconic acid esters, substituted (meth)acrylic amides, maleic anhydride, vinyl acetate, vinyl alcohols and vinyl ethers.

6. The process according to any one of claims 1–5, which further comprises depositing said extrudate onto a support to form a self-adhesive tape.

7. The process according to claim 6, wherein the K value of the adhesive composition is from about 65 to 80.

8. The process according to claim 7, wherein the support is a woven material.

* * * * *

UNITED STATES PATENT AND TRADEMARK OFFICE
CERTIFICATE OF CORRECTION

PATENT NO. : 6,613,870 B1
DATED : September 2, 2003
INVENTOR(S) : Harder et al.

It is certified that error appears in the above-identified patent and that said Letters Patent is hereby corrected as shown below:

<u>Column 4,</u>
Line 31, "maleic acid; esters" should read -- maleic acid esters --

Signed and Sealed this

Third Day of May, 2005

JON W. DUDAS
*Director of the United States Patent and Trademark Office*